April 19, 1949.  H. KONET  2,468,016
CAGING MECHANISM
Filed Feb. 9, 1944
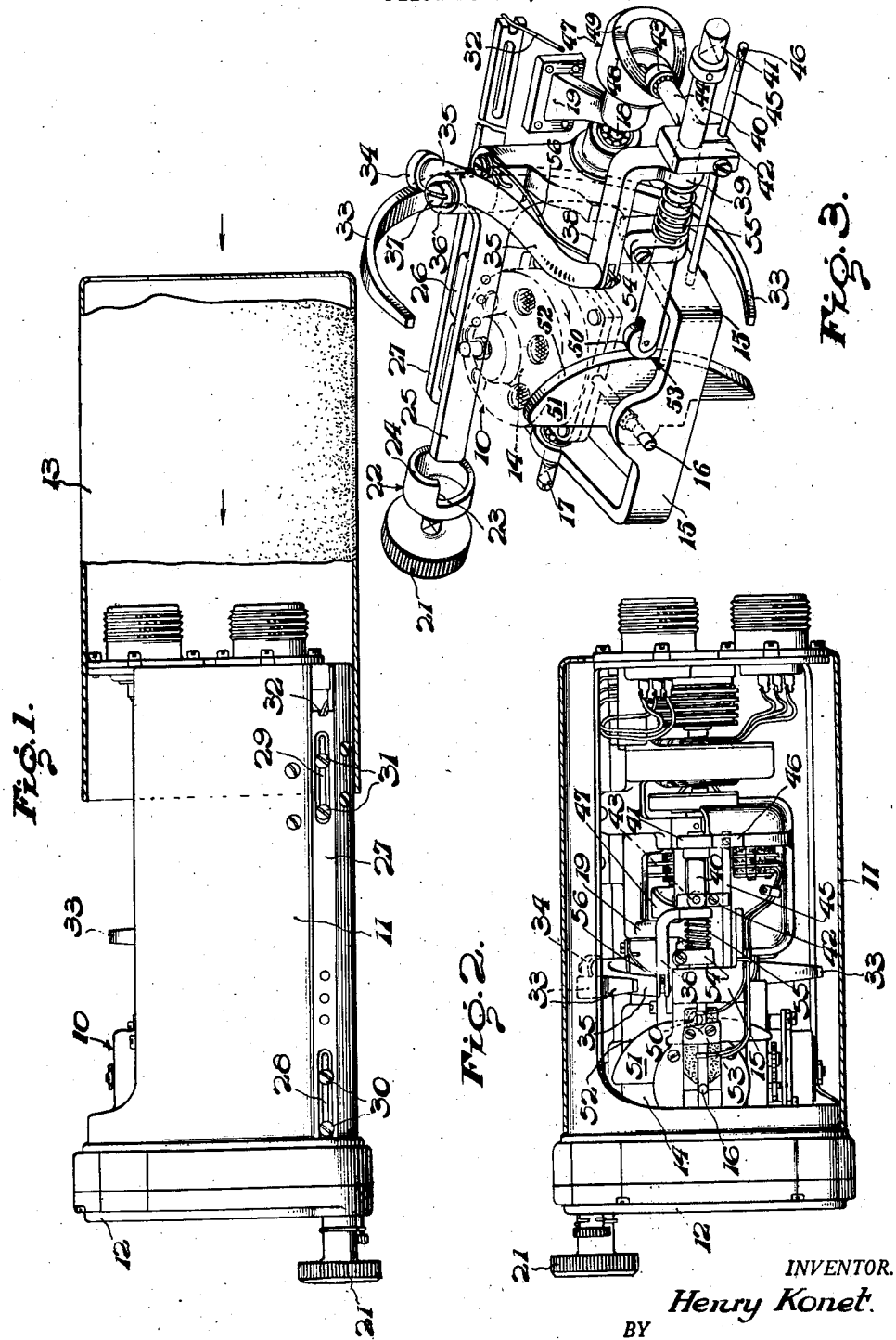
INVENTOR.
Henry Konet.
BY
ATTORNEY Patented Apr. 19, 1949

2,468,016

UNITED STATES PATENT OFFICE 2,468,016

CAGING MECHANISM

Henry Konet, Paramus, N. J., assignor to Bendix Aviation Corporation, Teterboro, N. J., a corporation of Delaware Application February 9, 1944, Serial No. 521,687

14 Claims. (Cl. 74—5.1)

This invention relates to gyroscopic devices, such as, gyro verticals, artificial horizons, etc., and more particularly to a novel apparatus for caging and centralizing such devices.

Various mechanisms have been proposed, heretofore, for centralizing and locking gyroscopic devices but most of these possess the inherent disadvantage that for any relatively large deviation from a normally central position of either the gyro rotor spin axis or the mounting gimbal, rapid caging was impossible because the operating portions of the caging mechanism were carried by some part of the housing enclosing the gyroscope and the pilot had to perform some intermediate step to return either the rotor or the gimbal into the sphere of operation of the caging apparatus. Moreover, with the prior art devices, the caging operation was very sudden so that it oftentimes resulted in serious damage to the bearings, etc., of the gyroscope.

An object of the present invention, therefore, is to provide a novel caging, centralizing and locking mechanism for gyroscopic devices which accomplishes its purpose and function rapidly and reliably notwithstanding the position of the rotor or its mounting gimbal and, moreover, whose action is relatively gentle upon the delicate portions of the gyroscope so that the latter does not become injured due to repeated caging operations.

Another object of the present invention is to provide a novel caging device for gyroscopic devices, such as, artificial horizons, gyro verticals, etc.

A further object of the invention is to provide a novel caging apparatus for gyroscopic devices which operates to simultaneously cage and centralize both the rotor and the mounting means therefor.

Another object of the invention is to provide a novel caging and centralizing apparatus for gyroscopic devices which is operable at all times to cage and centralize the gyroscope whether it be running or at rest.

A further object is to provide a gyroscopic horizon, or the like, with novel caging means which is adapted to cage and centralize the gyroscope simultaneously about two axes of oscillation.

A still further object of the invention is to provide a novel caging apparatus for gyroscopic devices wherein the caging and centralizing mechanism is supported by the rotor bearing frame to be movable therewith thereby facilitating a caging operation notwithstanding the angle of departure of the gyroscope from a normal position relative to its housing.

The above and other objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings wherein like reference characters refer to like parts throughout the several views, Figure 1 is a side view of a gyroscopic device such as, an artificial horizon, for example, embodying the novel caging means of the present invention and having the outer casing thereof removed;

Figure 2 is a view of the instrument of Figure 1 rotated 180° about its longitudinal axis; and, Figure 3 is a perspective view, with the inner casing removed, of the novel subject matter of the present invention.

The novel caging apparatus of the present invention is illustrated as applied to an artificial horizon gyro, generally designated with the reference numeral 10, mounted within an inner casing 11 having a bezel cover 12 for closing the open end thereof together with an outer casing 13 adapted for enclosing the gyro and casing 11.

The artificial horizon gyro is provided with a rotor (not shown), mounted within a rotor bearing frame or casing 14 for spinning about a normally vertical axis. The rotor casing is mounted for oscillation about a horizontal axis within a gimbal ring 15 by way of suitable trunnions 16, only one of which is visible in Figure 3. The gimbal, in turn, is mounted for oscillation about a second horizontal axis by way of outer trunnions 17 and 18, the former being secured to a part of inner casing 11 supporting the operating mechanism of the instrument and the latter being supported by a bracket 19 which is secured to the inner casing. The gyro rotor is thus provided with three degrees of freedom and the instrument, when mounted on a craft, has its outer trunnions 17, 18 arranged parallel to the longitudinal craft axis and the inner trunnions 16 arranged parallel with the craft's transverse axis.

Coming now to the novel caging and centralizing apparatus of the present invention, the latter is shown in Figure 3 as comprising an actuating knob 21 carrying a cam member 22 formed with a low surface 23 and a high surface 24, the former defining a normally uncaged position and the latter a caged position as will presently appear. Knob 21 is suitably arranged at the front of the instrument as shown in Figures 1 and 2 to be readily accessible to the operator.

Knob 21 together with its cam member 22 cooperate with a slidable bar 25 which is arranged on the inside of inner casing 11, the bar being fastened by means of a joint 26 to a parallel bar 27 arranged at the outer periphery of the inner casing, the latter being provided with a suitable opening for accommodating joint 26 and permitting limited motion thereof relative to the casing. Slots 28 and 29 are formed in bar 27 which cooperate with studs 30, 31, the latter acting as limit stops for the sliding motion in one direction or another for both bars 25 and 27. A spring member 32 engages the free end of bar 27 to normally urge the latter to the left, as shown in Figure 3, so that bar 25 is caused to rest on the low surface 23 of cam 22. If desired, outer bar 27 may be dispensed with and only inner bar 25 relied upon in which event spring 32 would be arranged to engage bar 25.

Bar 25 supports a bail 33 which is tapered forwardly a slight amount and is provided with the general configuration of inner casing 11, the bail being adapted for movement with bars 25 and 27. Resting against one face of bail 33 is a roller 34 which is supported by a finger 35, the latter being secured to a hollow sleeve 36 which is angularly movable about a stud 37 fixed to a portion of gimbal 15. The free end of finger 35 is pivotally secured to a bracket 38, the latter having an apertured boss 39 which is sleeved about a slidably mounted rod 40, the rod being supported in a bearing 41 at one end and within gimbal 15 at its opposite end.

Pinned to rod 40 adjacent boss 39 is a bracket 42 which supports a roller 43 by way of a stem 44 and which, furthermore, is provided with a groove cooperating with a guide rod 45 fixed at one end in a bearing 46 and at its other end to gimbal 15. Roller 43 cooperates with a cam 47 having a low or caging surface 48 and a high or uncaging surface 49, the cam being secured to bracket 19 and, therefore, fixed with respect to casing 11. Both bearing 41 which supports one end of rod 40 and bearing 46 which supports guide rod 45 are supported by an extending portion of the gimbal ring.

The free end of slidable rod 40 carries a roller 50 for cooperation with a cam 51 having a high or uncaging surface 52 and low or caging surface 53, the cam being fastened to inner trunnion 16 and being angularly movable with rotor casing 14. Also pinned to rod 40 is a bracket 54 and interposed between the bracket and boss 39 is a coiled spring 55 which is supported by the rod, the position of bracket 54 being adjustable along rod 40 to any amount desired depending upon the amount of stress it is desired to impose upon spring 55. Anchored to gimbal 15 is a spring member 56 which at its free end engages bracket 38 to normally urge the latter to the right and, therefore, bar 25 to the left to seek the low or uncaging surface of cam 22.

Coming now to the operation of the above-described novel caging mechanism, the whole mechanism is shown in an operative or caged position in the drawings. To uncage the gyro, knob 21 is moved in a counterclockwise direction, as viewed in Fig. 3, so that bars 25 and 27 under the action of springs 56 and 32, respectively, are moved to the left until bar 25 falls into the low or uncaging surface of cam 22. Movement of bar 25 results in forward movement on the part of finger 35 and bracket 38 whereby rollers 43 and 50 are drawn away from the low or caging surfaces of cams 47 and 51, respectively, so that the gyroscope is unlocked about both of its horizontal axes.

To cage the gyroscope, on the other hand, and assuming that the rotor casing 14 has been displaced angularly relative to casing 11 so that cam 51 has assumed some position other than that shown in Figure 3 and that gimbal 15 has been displaced angularly relative to casing 11 about axis 17—18, to also assume some position other than that shown in Figure 3, knob 21 is turned clockwise so that bar 25 is urged to move forwardly from the low surface of cam 22 to its high surface. Bail 33, as well as bar 27, are moved forwardly by bar 25 and the forward motion of the bail by virtue of its engagement with roller 34 causes finger 35 to pivot to the left about stud 37 carrying bracket 38 and its boss 39 therewith. Motion of boss 39 compresses spring 55 which forces bracket 54 to the left and rod 40 therewith so that rollers 43 and 50 engage some part of the high surfaces of cams 47 and 51.

Since cam 47 is fixed with respect to casing 11, motion of roller 43 from high surface 49 to low surface 48 will cause motion of gimbal 15 about trunnions 17, 18 toward a central position until the roller rests against the low surface at which time gimbal 15 is centralized and locked in such position. As roller 43 starts travelling from the high to the low surface of fixed cam 47 the angular motion imparted to the gimbal about trunnions 17, 18 urges roller 34 along bail 33 toward a central position on the bail, such position being attained the instant that the gimbal is centralized and locked. Simultaneously with the movement of roller 43 toward low surface 48 of cam 47, roller 50 engages some part of the high surface of cam 51 and causes motion thereof as well as of rotor casing 14 about trunnions 16 until the low surface 53 of cam 51 engages the roller at which time the rotor becomes centralized and locked in such position, it being noted that gyroscope becomes centralized and locked about both of its axes of oscillation at the same time.

The nature of spring 55 is such as to act in the nature of a damping device which absorbs some of the reactive forces set up by the gyroscope when rollers 43 and 50 initially engage cams 47 and 51. Such provision, therefore, prevents the sudden shock otherwise imparted to the gyroscope by prior caging devices and lengthens considerably the life thereof.

There is thus provided a novel caging mechanism for gyroscopic devices which is adapted to cage and centralize the gyroscope at all times notwithstanding its position and operable whether the gyroscope be spinning or at rest. Moreover, the caging and centralizing operation is relatively gradual as distinguished from the sudden caging heretofore provided in the art so that a more reliable navigational instrument is thereby provided.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art. For a definition of the limits of the invention, reference will be had primarily to the appended claims.

I claim:

1. A caging and centralizing device for gyroscopic devices comprising the combination with a gyro rotor adapted for spinning about one axis and means including a gimbal for mounting said rotor for freedom about two mutually perpendicular axes other than said spin axis, of means comprising a cam for caging and locking said rotor about one of said two mutually perpendicular axes, means comprising a second cam for caging and locking said rotor about the other of said two mutually perpendicular axes, and means for simultaneously actuating said first and second means in unison.

2. A caging and centralizing device for gyroscopic devices comprising the combination with a gyro rotor adapted for spinning about one axis and means including a gimbal for mounting said rotor for freedom about two mutually perpendicular axes other than said spin axis, of means comprising a cam for caging and locking said rotor about one of said two mutually perpendicular axes, means comprising a second cam for caging and locking said rotor about the other of said two mutually perpendicular axes, and means comprising rollers for simultaneously engaging said first and second cams whereby said rotor is caged and locked about said two mutually perpendicular axes.

3. A caging and centralizing device for gyroscopic devices comprising the combination with a gyro rotor provided with a casing and adapted for spinning about one axis and supporting means including a gimbal for mounting said rotor for freedom about two mutually perpendicular axes other than said spin axis, a cam secured for movement with said rotor casing for centralizing said rotor casing about one of said two mutually perpendicular axes, a second cam for centralizing said rotor about the other of said mutually perpendicular axes, a roller for travelling on said first cam, a second roller for travelling on said second cam, and means for moving said rollers to simultaneously travel on said first and second cams whereby said rotor is caged and centralized about both of said mutually perpendicular axes.

4. In a navigational instrument comprising a housing, a gyro rotor provided with a casing and adapted for spinning about one axis and a gimbal ring journalled in said housing for mounting said rotor for freedom about two mutually perpendicular axes other than said spin axis, means comprising a cam secured for movement with said rotor casing and a roller for travelling on said cam whereby said rotor is centralized about one of said mutually perpendicular axes, means comprising a second cam fixed to said housing and a second roller for travelling on said second cam whereby said gimbal is centralized and said rotor is thereby centralized about the other of said mutually perpendicular axes, and means for simultaneously moving said rollers to travel on their respective cams.

5. In a navigational instrument comprising a housing, a gyro rotor provided with a casing and adapted for spinning about one axis and a gimbal ring journalled in said housing for mounting said rotor for freedom about two mutually perpendicular axes other than said spin axis, means comprising a cam secured for movement with said rotor casing and a roller for travelling on said cam whereby said rotor is centralized about one of said mutually perpendicular axes, means comprising a second cam fixed to said housing and a second roller for travelling on said second cam whereby said gimbal is centralized and said rotor is thereby centralized about the other of said mutually perpendicular axes, means for simultaneously moving said rollers to travel on their respective cams, and yieldable means between said last-named means and said rollers.

6. In a navigational instrument comprising a housing, a gyro rotor provided with a casing and adapted for spinning about one axis and a gimbal ring journalled in said housing for mounting said rotor for freedom about two mutually perpendicular axes other than said spin axis, means comprising a cam secured for movement with said rotor casing, means comprising a second cam fixed to said housing, means carried by said gimbal and slidably mounting a pair of rollers for cooperation with said cams, and means for actuating said last-named means whereby one of said rollers engages said fixed cam to centralize said gimbal and thereby centralize said rotor about one of said mutually perpendicular axes and the other of said rollers simultaneously engages said first cam to centralize said rotor about the other of said mutually perpendicular axes.

7. In a navigational instrument comprising a housing, a gyro rotor provided with a casing and adapted for spinning about one axis and a gimbal ring journalled in said housing for mounting said rotor for freedom about two mutually perpendicular axes other than said spin axis, means comprising a cam secured for movement with said rotor casing, means comprising a second cam fixed to said housing, means carried by said gimbal and slidably mounting a pair of rollers for cooperation with said cams, means for actuating said last-named means whereby one of said rollers engages said fixed cam to centralize said gimbal and thereby centralize said rotor about one of said mutually perpendicular axes and the other of said rollers simultaneously engages said first cam to centralize said rotor about the other of said mutually perpendicular axes, and yieldable means interposed between said actuating means and the roller mounting means.

8. In a navigational instrument comprising a housing, a gyro rotor provided with a casing and adapted for spinning about one axis and a gimbal ring journalled in said housing for mounting said rotor for freedom about two mutually perpendicular axes other than said spin axis, means comprising a cam secured for movement with said rotor casing, means comprising a second cam fixed to said housing, means carried by said gimbal and slidably mounting a pair of rollers for cooperation with said cams, means for actuating said last-named means whereby one of said rollers engages said fixed cam to centralize said gimbal and thereby centralize said rotor about one of said mutually perpendicular axes and the other of said rollers simultaneously engages said first cam to centralize said rotor about the other of said mutually perpendicular axes, and means comprising a movable bail for operating said actuating means.

9. In a navigational instrument comprising a housing, a gyro rotor provided with a casing and adapted for spinning about one axis and a gimbal ring journalled in said housing for mounting said rotor for freedom about two mutually perpendicular axes other than said spin axis, means comprising a cam secured for movement with said rotor casing, means comprising a second cam fixed to said housing, means carried by said gimbal and slidably mounting a pair of rollers for cooperation with said cams, means for actuating said last-named means whereby one of said rollers engages said fixed cam to centralize said gimbal and thereby centralize said rotor about one of said mutually perpendicular axes and the other of said rollers simultaneously engages said first cam to centralize said rotor about the other of said mutually perpendicular axes, means comprising a movable bail for operating said actuating means, and means comprising a knob arranged exterior of said housing for moving said bail.

10. In a navigational instrument comprising a housing, a gyro rotor provided with a casing and adapted for spinning about one axis and a gimbal ring journalled in said housing for mounting said rotor for freedom about two mutually perpendicular axes other than said spin axis, means comprising a cam secured for movement with said rotor casing, means comprising a second cam fixed to said housing, a roller for cooperation with said first cam, a second roller for cooperation with said fixed cam, common means for moving said rollers into engagement with said cams, actuating means for said common means comprising a member pivoted on said gimbal and having a roller thereon, and means comprising a movable bail for engaging said last-named roller to pivot said member whereby said common means is operated so that said second roller engages said fixed cam to move the roller of said pivoted member along said bail to a central position whereupon said gimbal is centralized thereby centralizing said rotor about one of said mutually perpendicular axes and said first roller engages said first cam to centralize said rotor about the other of said mutually perpendicular axes.

11. In a caging and centralizing device for universally mounted gyroscopes, the combination with the gyroscope, of means comprising a cam movable with said gyroscope for caging and locking said gyroscope about one axis thereof, means comprising a cam fixed relative to said gyroscope for caging and locking said gyroscope about a second axis thereof at right angles to said first axis, and means for engaging said cams whereby said gyroscope is simultaneously caged and locked about said first and second axes.

12. In a gyro vertical, an outer casing therefor, a gyroscope universally mounted in said casing on two mutually perpendicular horizontal axes with the spin axis vertical, and means comprising a cam movable about one of said two axes and a second cam fixed about the other of said two axes for simultaneously caging and locking said gyroscope about both of said horizontal axes whereby said gyroscope becomes locked with its spin axis mutually perpendicular to said two horizontal axes.

13. In a gyro vertical, an outer casing therefor, a gyroscope universally mounted in said casing on two mutually perpendicular horizontal axes with the spin axis vertical, means comprising a cam movable about one of said two horizontal axes and a second cam fixed about the other of said two horizontal axes, a first roller for travelling on said fixed cam to cage and lock said gyroscope about one of said horizontal axes, a second roller for travelling on the other of said cams to cage and lock said gyroscope about the other of said horizontal axes, and means for simultaneously causing said rollers to travel on said cams.

14. In a gyro vertical, an outer casing therefor, a gyroscope universally mounted in said casing on two mutually perpendicular horizontal axes with the spin axis vertical, means comprising a cam movable about one of said two horizontal axes and a second cam fixed about the other of said two horizontal axes, a first roller for travelling on said fixed cam to cage and lock said gyroscope about one of said horizontal axes, a second roller for travelling on the other of said cams to cage and lock said gyroscope about the other of said horizontal axes, means for simultaneously causing said rollers to travel on said cams, and yieldable means interposed between said last-named means and said rollers.

HENRY KONET.

REFERENCES CITED

The following references are of record in the file of this patent:

UNITED STATES PATENTS

| Number | Name | Date |
| --- | --- | --- |
| 1,996,896 | Bennett | Apr. 9, 1933 |
| 2,348,603 | Carlson | May 9, 1944 |
| 2,350,769 | Kimball | June 6, 1944 |
| 2,366,721 | Gabrielson | Jan. 9, 1945 |